(12) United States Patent
Takeda

(10) Patent No.: US 8,172,019 B2
(45) Date of Patent: May 8, 2012

(54) TOWING TRACTOR

(75) Inventor: Mitsumasa Takeda, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 2 days.

(21) Appl. No.: 12/939,622

(22) Filed: Nov. 4, 2010

(65) Prior Publication Data

US 2011/0108336 A1    May 12, 2011

(30) Foreign Application Priority Data

Nov. 6, 2009  (JP) ................................. 2009-255417

(51) Int. Cl.
*B60K 1/00*  (2006.01)
(52) U.S. Cl. .................... 180/65.31; 180/65.6; 180/65.1
(58) Field of Classification Search ................. 180/65.1, 180/65.31, 65.6, 281, 292, 165
See application file for complete search history.

(56) References Cited

U.S. PATENT DOCUMENTS

| | | | | | |
|---|---|---|---|---|---|
| 2,157,499 | A | * | 5/1939 | Rossmann | 267/52 |
| 3,700,060 | A | * | 10/1972 | Keene et al. | 180/165 |
| 3,749,196 | A | * | 7/1973 | Traylor | 180/349 |
| 3,751,021 | A | * | 8/1973 | Foster | 267/52 |
| 4,289,214 | A | * | 9/1981 | Spence | 180/234 |
| 4,438,944 | A | * | 3/1984 | Della-Moretta | 280/446.1 |
| 5,853,655 | A | * | 12/1998 | Baker | 266/44 |
| 6,688,481 | B1 | * | 2/2004 | Adner et al. | 212/195 |
| 6,820,707 | B1 | * | 11/2004 | Cantemir | 180/65.6 |
| 7,140,460 | B2 | * | 11/2006 | Shimizu et al. | 180/65.225 |
| 7,147,070 | B2 | * | 12/2006 | Leclerc | 180/14.2 |
| 2011/0056755 | A1 | * | 3/2011 | Futahashi et al. | 180/65.25 |
| 2011/0094807 | A1 | * | 4/2011 | Pruitt et al. | 180/65.6 |
| 2011/0114399 | A1 | * | 5/2011 | Palfai et al. | 180/65.6 |
| 2011/0180336 | A1 | * | 7/2011 | Kurata | 180/65.1 |

FOREIGN PATENT DOCUMENTS

| | | | |
|---|---|---|---|
| JP | 2000-152470 A | 5/2000 | |
| JP | 2005-271909 A | 10/2005 | |

* cited by examiner

*Primary Examiner* — J. Allen Shriver, II
*Assistant Examiner* — James Triggs
(74) *Attorney, Agent, or Firm* — Sughrue Mion, PLLC

(57) ABSTRACT

A towing tractor includes a tractor body, a motor, a controller, a cable electrically connecting the motor and the controller, an axle housing integrally mounted with the motor, and a suspension through which the axle housing is supported by the tractor body. The controller is fixed to the tractor body. The length of the cable is greater than the shortest distance between the motor and the controller. The suspension allows vertical movement of the axle housing and the motor relative to the tractor body. The controller, the axle housing and the motor are arranged in this order in longitudinal direction of the tractor body. The controller is located above the axle housing and the motor. The cable led out from the motor extends below the axle housing and then upward toward the controller. The part of the cable between the axle housing and the controller forms an extra length portion.

8 Claims, 4 Drawing Sheets

TOWING TRACTOR

BACKGROUND OF THE INVENTION

The present invention relates to a towing tractor.

Generally, towing tractors are used, for example, for transportation of cargo in airports. Some tractors are equipped with a motor as a power source and a controller for controlling electric power supply to the motor. The motor and the controller are electrically connected via cables. The motor is connected through a powertrain to an axle so that mechanical power is transmitted from the motor through the powertrain to the axle. The axle is received in an axle housing. The axle housing is supported by a tractor body through a suspension. The suspension allows vertical movement of the axle housing relative to the tractor body.

The axle housing is integrally mounted with the motor and therefore moved vertically together with the motor. The controller is fixedly mounted to the tractor body. When the cable is pulled by vertical movement of the axle housing and the motor relative to the controller, such movement may cause the cable to be tensioned. To prevent this, an example of cable arrangement is disclosed in Japanese Unexamined Patent Application Publication No. 2000-152470.

The publication No. 2000-152470 discloses a hybrid vehicle with such cable arrangement. The vehicle includes a power head (controller) as a stationary object relative to the body and a transaxle case (axle housing) as a movable object relative to the body. The power head is supported by the body through a bracket with relatively high rigidity, and the transaxle case is supported by the body through a bracket with relatively low rigidity. The power head and the transaxle case each has a terminal to which the cable is connected. The length of the cable between the terminals is larger than the shortest distance between the terminals thereby to form an extra length portion in the cable. When the cable is pulled by vertical movement of the transaxle case relative to the power head, the extra length portion of the cable is unbent, thereby preventing the cable from being tensioned.

In the cable arrangement disclosed in the publication No. 2000-152470, the power head has the terminal in its lower surface, and the transaxle case has the terminal in its upper and side surfaces. The cable extends from the upper and side surfaces of the transaxle case toward the lower surface of the power head. In this case, the extra length portion is merely formed in the upwardly extending cable between the power head and the transaxle case located under the power head, by use of the length of the cable extending from the transaxle case to the power head, which makes it difficult to provide the extra length portion of sufficient length in the cable. Thus, when the cable is pulled by vertical movement of the transaxle case, such movement may cause the cable to be tensioned.

The present invention is directed to providing a towing tractor that prevents a cable from being tensioned due to the vertical movement of an axle housing and a motor relative to a controller.

SUMMARY OF THE INVENTION

In accordance with an aspect of the present invention, a towing tractor includes a tractor body, a motor provided in the tractor body, a controller for controlling electric power supply to the motor, a cable electrically connecting the motor and the controller, an axle housing integrally mounted with the motor, and a suspension through which the axle housing is supported by the tractor body. The controller is fixed to the tractor body. The length of the cable is greater than the shortest distance between the motor and the controller. The suspension allows vertical movement of the axle housing and the motor relative to the tractor body. The controller, the axle housing and the motor are arranged in this order in longitudinal direction of the tractor body. The controller is located above the axle housing and the motor. The cable led out from the motor extends below the axle housing and then upward toward the controller. The part of the cable between the axle housing and the controller forms an extra length portion.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

The following will describe the first embodiment of the towing tractor according to the present invention with reference to the accompanying drawings. It is noted that the left-hand side and the right-hand side as viewed in FIG. 1 are the front side and the rear side of the towing tractor, respectively, and that the upper and lower sides as viewed in FIG. 1 are the upper and lower sides of the towing tractor, respectively.

Figure 1:
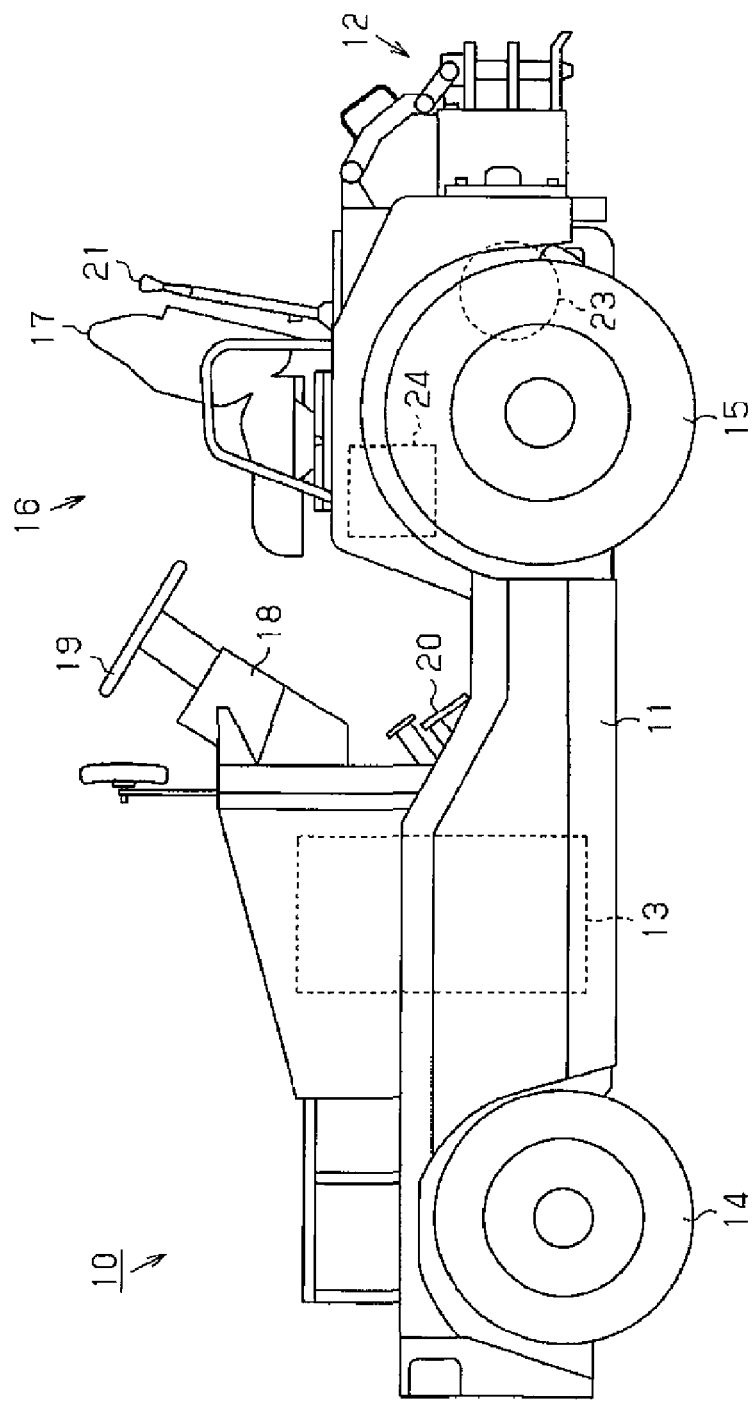
FIG. 1 is a side view of a towing tractor according to a first embodiment of the present invention.

Referring to FIG. 1, a towing tractor 10 has a drawbar unit 12 at the rear end of the tractor body 11. The towing tractor 10 is equipped with a battery 13 received in a battery room (not shown) provided in the front portion of the tractor body 11. The towing tractor 10 has steered wheels (front wheels) 14 in the front lower portion of the tractor body 11 and driven wheels (rear wheels) 15 in the rear lower portion of the tractor body 11. The towing tractor 10 has a cab 16 provided in the rear upper portion of the tractor body 11 and having laterally arranged two seats 17 (only one being shown in FIG. 1).

In the cab 16, a steering column 18 is located forward of the seat 17. The steered wheels 14 is steered by a steering wheel 19 mounted to the steering column 18. An accelerator pedal 20, is provided on the cab floor forward of the seat 17. A drawbar lever 21 is provided rearward of the seat 17 within the reach of the seated driver.

Figure 2:
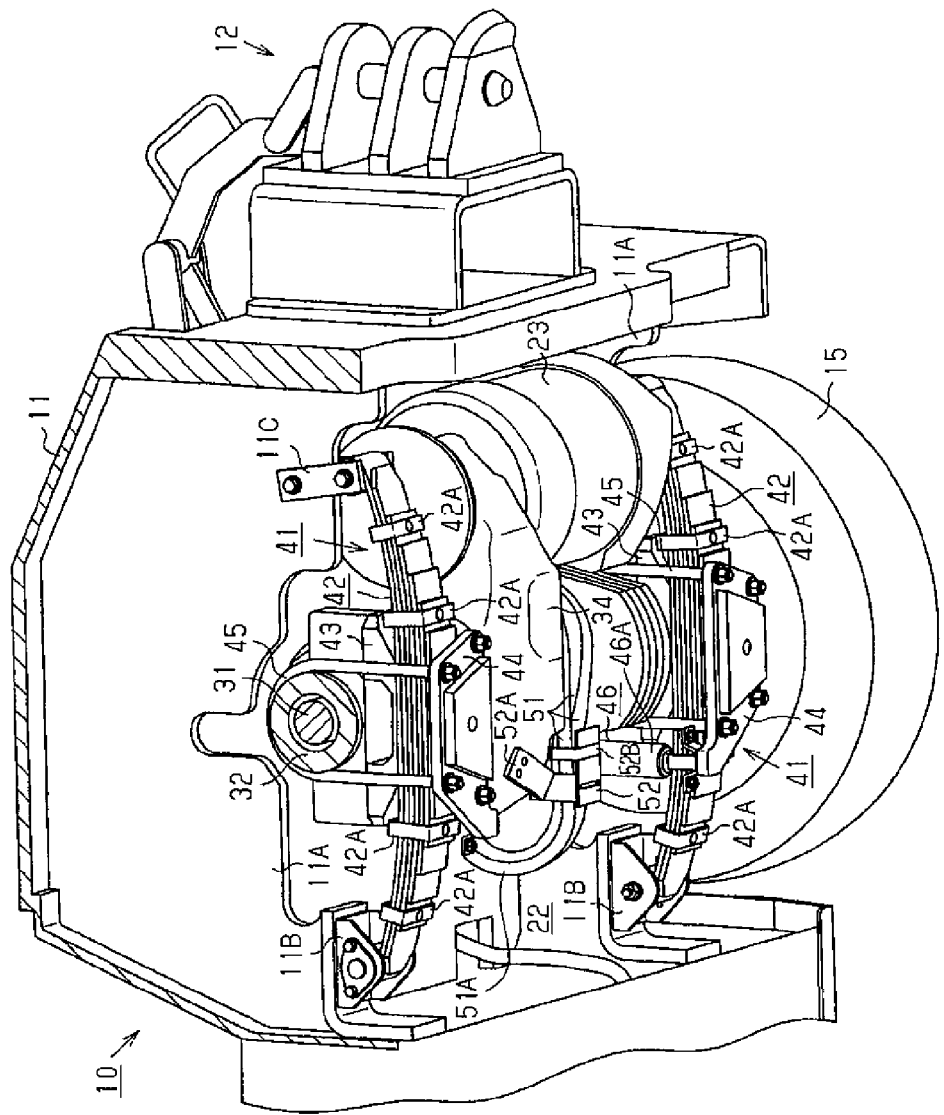
FIG. 2 is a fragmentary perspective view of a rear portion of the towing tractor of FIG. 1.
Figure 3:
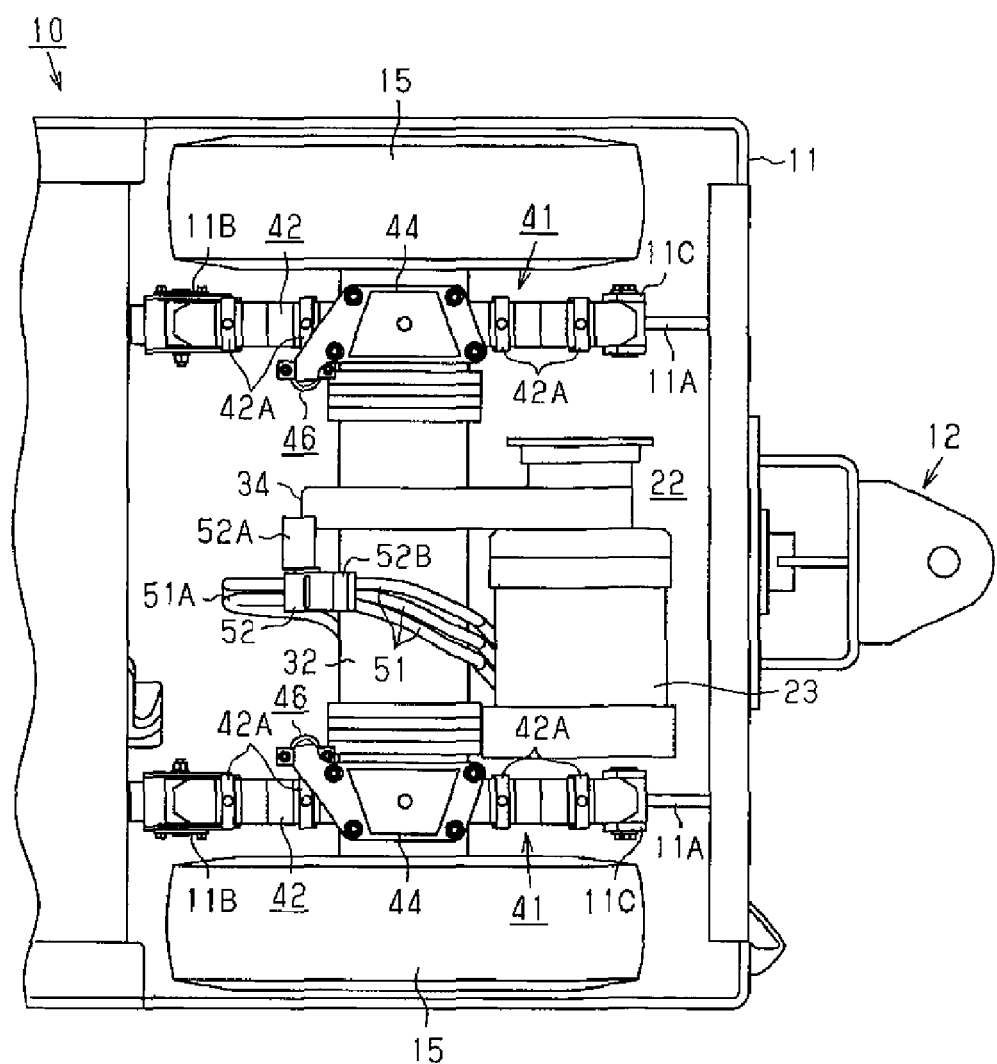
FIG. 3 is a plan view of the rear portion of the towing tractor of FIG. 2.

Referring to FIGS. 2 and 3, a motor room 22 is provided in the rear portion of the tractor body 11. The motor room 22 is a space formed between a pair of rear side members 11A forming part of the tractor body 11, and receives therein a motor 23. In the motor room 22, an axle 31 is provided forward of the motor 23 so as to extend in transverse direction of the tractor body 11. Each end of the axle 31 is connected to the driven wheel 15. The axle 31 is received in a cylindrical axle housing 32 and rotatably supported by the axle housing 32 through a bearing (not shown) provided on the inner peripheral surface of the axle housing 32.

Although not shown in the drawings, a gear secured to the periphery of the axle 31 is meshed with another gear secured to the periphery of the output shaft of the motor 23, which provides mechanical connection between the axle 31 and the motor 23 so that driving force generated by the motor 23 is transmitted to the axle 31. The gears are received in a gear case 34 that is integrally mounted with the axle housing 32 and the motor 23. The axle housing 32 is integrally mounted with the motor 23 through the gear case 34 and located forward of the motor 23.

Figure 4:
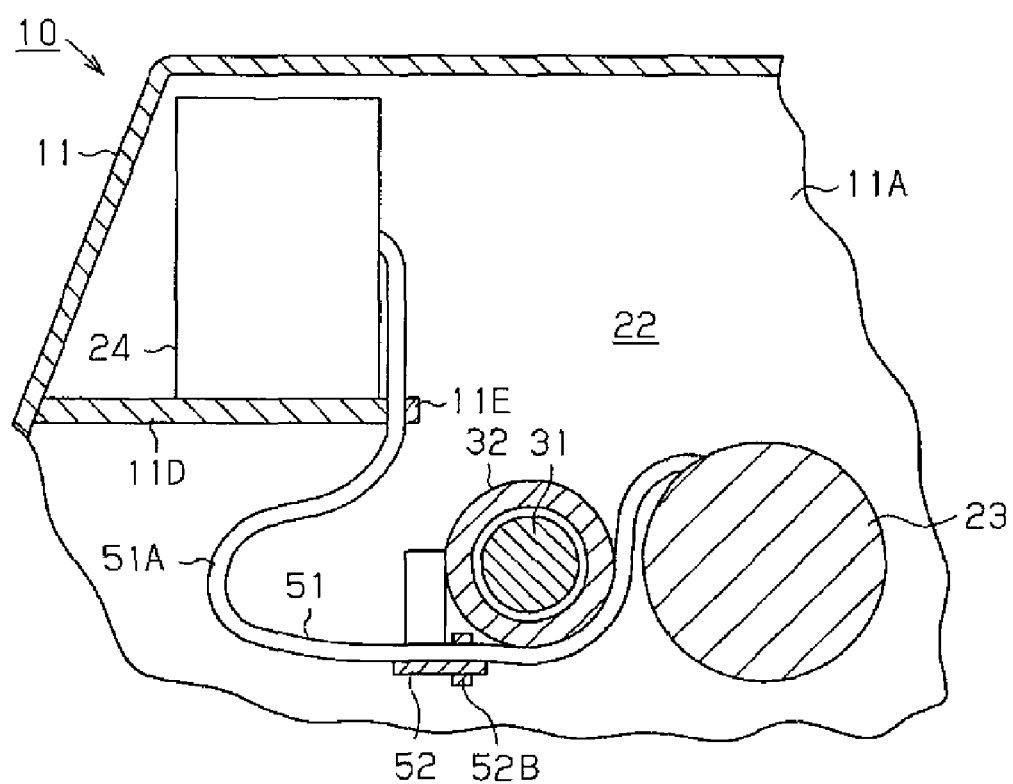
FIG. 4 is a schematic sectional view of the rear portion of the towing tractor of FIGS. 2 and 3.

As shown in FIG. 1, the towing tractor 10 has a controller 24 provided below the seat 17 for controlling electric power supply from the battery 13 to the motor 23. As shown in FIG. 4, the controller 24 is fixedly mounted to the tractor body 11 through a bracket 11D provided above and forward of the axle housing 32. The controller 24, the axle housing 32 and the motor 23 are arranged in this order in longitudinal direction of the tractor body 11, and the controller 24 is located above and forward of the axle housing 32. The towing tractor 10 is of a battery-powered type where the motor 23 is supplied with electric power from the battery 13 and operated under the control of the controller 24 to drive the driven wheels 15.

As shown in FIGS. 2 and 3, the towing tractor 10 has a pair of suspensions 41 in the rear portion of the tractor body 11. Each suspension 41 includes a leaf spring 42 made of plural stacked plates of different lengths fastened together using several clips 42A. The leaf springs 42 are provided on opposite sides of the axle 32, extending in the longitudinal direction of the tractor body 11.

The front end of the leaf spring 42 is rotatably supported by the tractor body 11 through a bracket 11B that is fixedly mounted to the rear side member 11A. The rear end of the leaf spring 42 is rotatably supported by the tractor body 11 through a shackle link 11C that is connected to the rear side member 11A. The shackle link 11C is rotatably supported by the rear side member 11A, which allows the shackle link 11C to rotate in accordance with the deflection of the leaf spring 42.

The suspension 41 further includes a shock absorber 46 one end of which is supported by the tractor body 11 and the other end of which is coupled to the leaf spring 42. The shock absorber 46 has a structure in which the piston with orifice is reciprocally movable in the cylinder 46A filled with oil. Fluid friction resulting from the flow of oil through the orifice serves to dampen the deflection of the leaf spring 42, thereby preventing vibration of the tractor body 11.

The axle housing 32 is fixedly mounted to each leaf spring 42 by a U-bolt 45 through a pair of supports 43, 44 disposed on the top and bottom of the central portion of the leaf spring 42, as shown in FIG. 2. The axle housing 32 is supported by the tractor body 11 through the suspension 41, so that the axle housing 32 is allowed to move vertically relative to the tractor body 11

As shown in FIG. 4, the motor 23 and the controller 24 are electrically connected via three cables 51 (only one being shown in the drawing). Each cable 51 is connected at one end thereof to the terminal (not shown) provided in an upper portion of the motor 23. The cable 51 extends downward from the upper portion of the motor 23 through the space between the motor 23 and the axle housing 32, and then extends below the axle housing 32 along the outer surface of the axle housing 32.

As shown in FIG. 3, the cables 51 are arranged along the central portion of the axle housing 32 with respect to the transverse direction of the tractor body 11. There is provided a bracket 52 (fixing member) located forward of the central portion of the axle housing 32 for fixing the cables 51. The bracket 52 is supported by the gear case 34 (axle housing 32) through a fitting 52A. Part of the cables 51 extending along the bracket 52 is secured to the bracket 52 using a band 52b wounded around the cables 51 and the bracket 52 (see FIGS. 2 and 4). That is, the part of the cables 51 extending below the axle housing 32 is secured to the axle housing 32 through the bracket 52.

As shown in FIG. 4, the cable 51 extending below the axle housing 32 then extends upward in the space forward of the axle housing 32. Part of the cable 51 extending upward is secured to the bracket 11D through a clamp 11E. The cable 51 is connected at the other end thereof to the terminal (not shown) of the controller 24. The length of the cable 51 from the bracket 52 to the terminal of the controller 24 is larger than the shortest distance from the bracket 52 to the terminal of the controller 24. The part of the cable 51 between the bracket 52 and the terminal of the controller 24, that is, the part of the cable 51 between the axle housing 32 and the controller 24 forms an extra length portion 51A. The extra length portion 51A is located forward of the axle housing 32. The extra length portion 51A is located in the space under the controller 24. The extra length portion 51A is flexibly curved in the space adjacent to the axle housing 32, and the length of the extra length portion 51A is greater than the length of the vertical movement of the axle housing 32.

While the towing tractor 10 is traveling, vibration of the tractor body 11 causes deflection of the leaf spring 42 in the suspension 41 due to the load applied from the axle housing 32 mounted to the leaf spring 42, so that the axle housing 32 is allowed to be moved vertically relative to the tractor body 11. The motor 23 coupled to the axle housing 32 through the gear case 34 is moved vertically together with the axle housing 32. That is, the axle housing 32 and the motor 23 are moved vertically relative to the controller 24.

When the cable 51 is pulled by downward movement of the axle housing 32 and the motor 23, the extra length portion 51A of the cable 51 is unbent in accordance with the distance moved by the axle housing 32 and the motor 23, thereby preventing the cable 51 from being tensioned. Similarly, when the cable 51 is pushed by upward movement of the axle housing 32 and the motor 23, the extra length portion 51A is suitably deformed in the space under the controller 24, thereby preventing the cable 51 from being excessively bent.

The towing tractor 10 according to the first embodiment offers the following advantages.

(1) Since the cable 51 led out from the motor 23 is arranged below the axle housing 32, the length of the cable 51 can be increased, as compared to a case where the cable extends above the axle housing and then toward the controller. This arrangement of the cable 51 makes it easier to provide the extra length portion 51A of sufficient length in the cable 51 in the space forward of the axle housing 32. When the cable 51 is pulled by downward movement of the axle housing 32 and the motor 23 or pushed by upward movement of the axle housing 32 and the motor 23, the extra length portion 51A is suitably deformed so as to allow such movements. Thus the cable 51 is prevented from being tensioned and excessively bent due to the vertical movement of the axle housing 32 and the motor 23.

(2) The cable 51 is connected to the terminal provided in the upper portion of the motor 23. This prevents the electric connection between the cable 51 and the motor 23 from being exposed to water splash and dust possibly entering into the tractor body 11 from below, as compared to a case where the cable is connected to the terminal provided in the lower portion of the motor.

(3) Part of the cable 51 extending below the axle housing 32 is secured to the axle housing 32 through the bracket 52, which prevents the cable 51 from being vibrated by the vibration of the tractor body 11.

(4) The cable 51 led out from the motor 23 extends below the axle housing 32. This prevents the cable 51 from being pulled by the axle housing 32 when the axle housing 32 and the motor 23 are moved upward, unlike in the case where the cable from the motor extends above the axle housing.

(5) For example, when only one of the driven wheels 15 goes over the bump on the road, one side of the axle housing 32 is moved upward while the other side is moved downward, but no vertical movement of the central portion of the axle housing 32 occurs. The cable 51 located along the central portion of the axle housing 32 is prevented from being affected by such up and down movement of the axle housing 32.

(6) The cable 51 extends downward from the upper portion of the motor 23 and then below the axle housing 32 along the outer surface of the axle housing 32. The part of the cable 51 extending below the axle housing 32 is secured to the lower portion of the axle housing 32 through the bracket 52. The provision of the bracket 52 prevents the cable 51 from hanging down under the axle housing 32 when the motor room is opened to the outside of the tractor body at the bottom.

The above embodiment may be modified in various ways as exemplified below.

Part of the cable 51 does not necessarily need to be secured to the axle housing 32 through the bracket 52.

Although in the previous embodiment the cable 51 is connected to the terminal provided in the upper portion of the motor 23, it may be connected to the terminal provided in the lower portion of the motor.

Although in the previous embodiment the suspension uses a leaf spring, it may use a coil spring.

Although in the previous embodiment the invention is applied to the battery-powered towing tractor, it is applicable to a hybrid towing tractor equipped with not only an electric motor and a battery but also an engine.

What is claimed is:

1. A towing tractor, comprising:
   a tractor body;
   a motor provided in the tractor body;
   a controller for controlling electric power supply to the motor, the controller being fixed to the tractor body;
   a cable electrically connecting the motor and the controller, the length of the cable being greater than the shortest distance between the motor and the controller;
   an axle housing integrally mounted with the motor; and
   a suspension through which the axle housing is supported by the tractor body, the suspension allowing vertical movement of the axle housing and the motor relative to the tractor body,
   wherein the controller, the axle housing and the motor are arranged in this order in longitudinal direction of the tractor body, the controller is located above the axle housing and the motor, the cable led out from the motor extends below the axle housing and then upward toward the controller, and the part of the cable between the axle housing and the controller forms an extra length portion.

2. The towing tractor according to claim 1, wherein the cable is led out from an upper portion of the motor and then extends downward between the motor and the axle housing.

3. The towing tractor according to claim 1, further comprising a fixing member by which the part of the cable extending below the axle housing is secured to the axle housing.

4. The towing tractor according to claim 1, wherein the extra length portion is located in a space under the controller.

5. The towing tractor according to claim 1, wherein the part of the cable extending below the axle housing is located along a central portion of the axle housing with respect to transverse direction of the tractor body.

6. The towing tractor according to claim 1, wherein the towing tractor is of a battery-powered type.

7. The towing tractor according to claim 1, wherein the extra length portion is flexibly curved in a space adjacent to the axle housing.

8. The towing tractor according to claim 1, wherein the length of the extra length portion is greater than the length of the vertical movement of the axle housing.

\* \* \* \* \*